(12) United States Patent
Yoshida

(10) Patent No.: US 8,320,070 B2
(45) Date of Patent: Nov. 27, 2012

(54) MAGNETIC DISK DRIVE AND METHOD FOR ADJUSTING PARAMETER IN THE SAME

(75) Inventor: Osamu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/151,994

(22) Filed: Jun. 2, 2011

(65) Prior Publication Data

US 2011/0317303 A1 Dec. 29, 2011

(30) Foreign Application Priority Data

Jun. 23, 2010 (JP) ................................ 2010-143146

(51) Int. Cl.
- G11B 21/02 (2006.01)
- G11B 19/02 (2006.01)
- G11B 5/09 (2006.01)
- G11B 27/36 (2006.01)

(52) U.S. Cl. ................ 360/75; 360/69; 360/53; 360/31; 711/111

(58) Field of Classification Search .................. None
See application file for complete search history.

(56) References Cited

U.S. PATENT DOCUMENTS

| | | | | |
|---|---|---|---|---|
| 2002/0027733 A1* | 3/2002 | Kikuta et al. | .................. | 360/60 |
| 2010/0153680 A1* | 6/2010 | Baum et al. | .................. | 711/173 |
| 2011/0107814 A1* | 5/2011 | Kinouchi | .................... | 73/12.06 |

FOREIGN PATENT DOCUMENTS

| | | |
|---|---|---|
| JP | 03-209601 | 9/1991 |
| JP | 2000-048312 A | 2/2000 |
| JP | 2004-005852 | 1/2004 |
| JP | 2004-146036 | 5/2004 |
| JP | 2005-018977 A | 1/2005 |
| JP | 2005-209281 A | 8/2005 |
| JP | 2005-267702 | 9/2005 |
| JP | 2009-140585 | 6/2009 |

OTHER PUBLICATIONS

Japanese Office Action dated Aug. 30, 2011, filed in Japanese counterpart Application No. 2010-143146, 6 pages (with English translation).

Japanese Office Action dated Dec. 6, 2011, filed in Japanese counterpart Application No. 2010-143146, 8 pages (with English translation).

* cited by examiner

Primary Examiner — Andrew L Sniezek

(74) Attorney, Agent, or Firm — Patterson & Sheridan, LLP

(57) ABSTRACT

According to one embodiment, a magnetic disk drive includes a parameter management table, a parameter adjustment module and an interpolation module. The parameter management table stores a parameter used to write or read data to or from a disk in the parameter management table in association with each of a plurality of predetermined temperature divisions. The parameter adjustment module adjusts a first parameter stored in the parameter management table in association with a first temperature division to a second parameter adapted for the first temperature division if an ambient temperature detected by a temperature detector corresponds to the first temperature division and if the first parameter is unadjusted. The interpolation module updates an unadjusted third parameter corresponding to a third temperature division between the first temperature division and a second temperature division for which the parameter is adjusted based on a result of the adjustment of the first parameter.

12 Claims, 12 Drawing Sheets

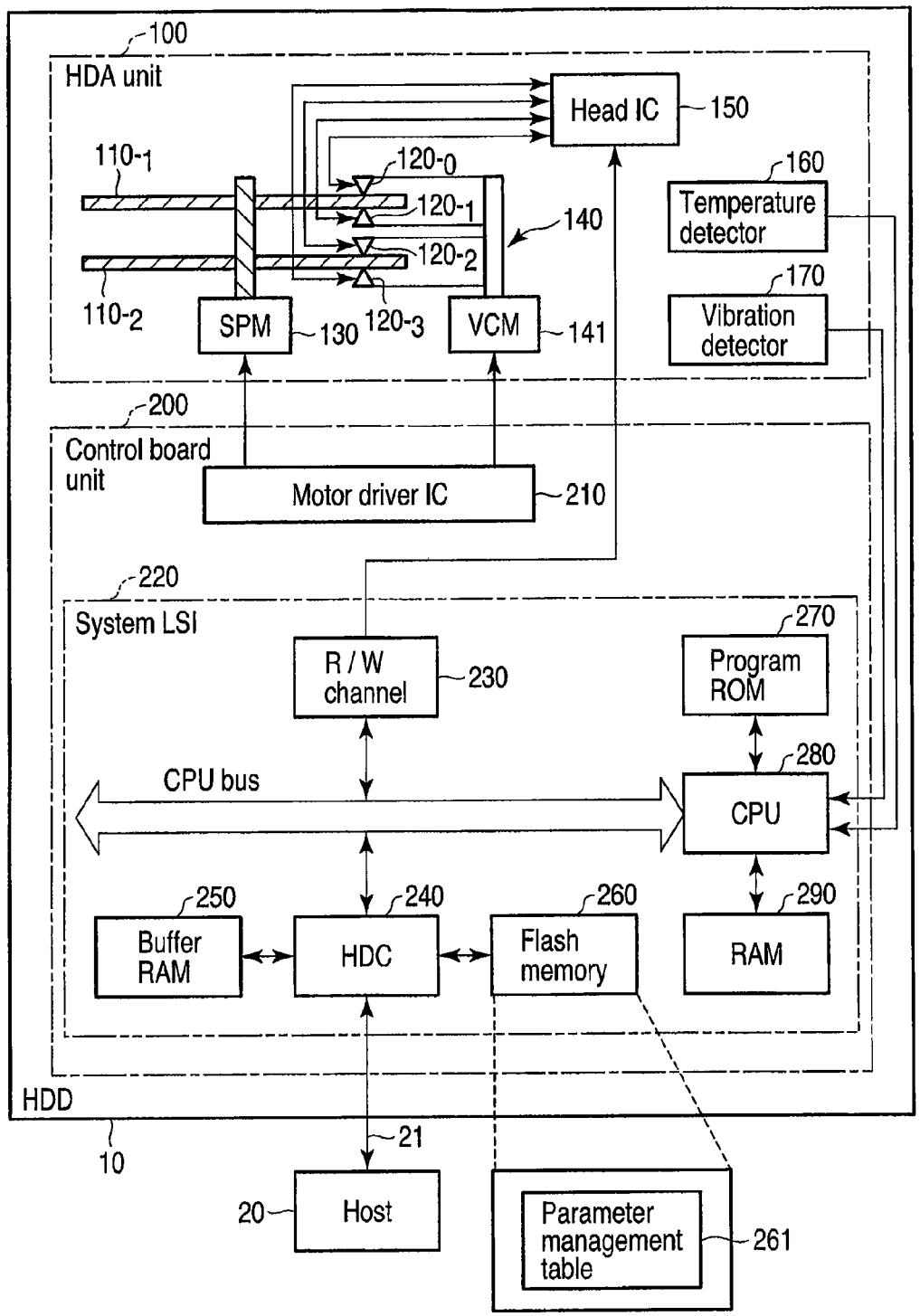
F I G. 1

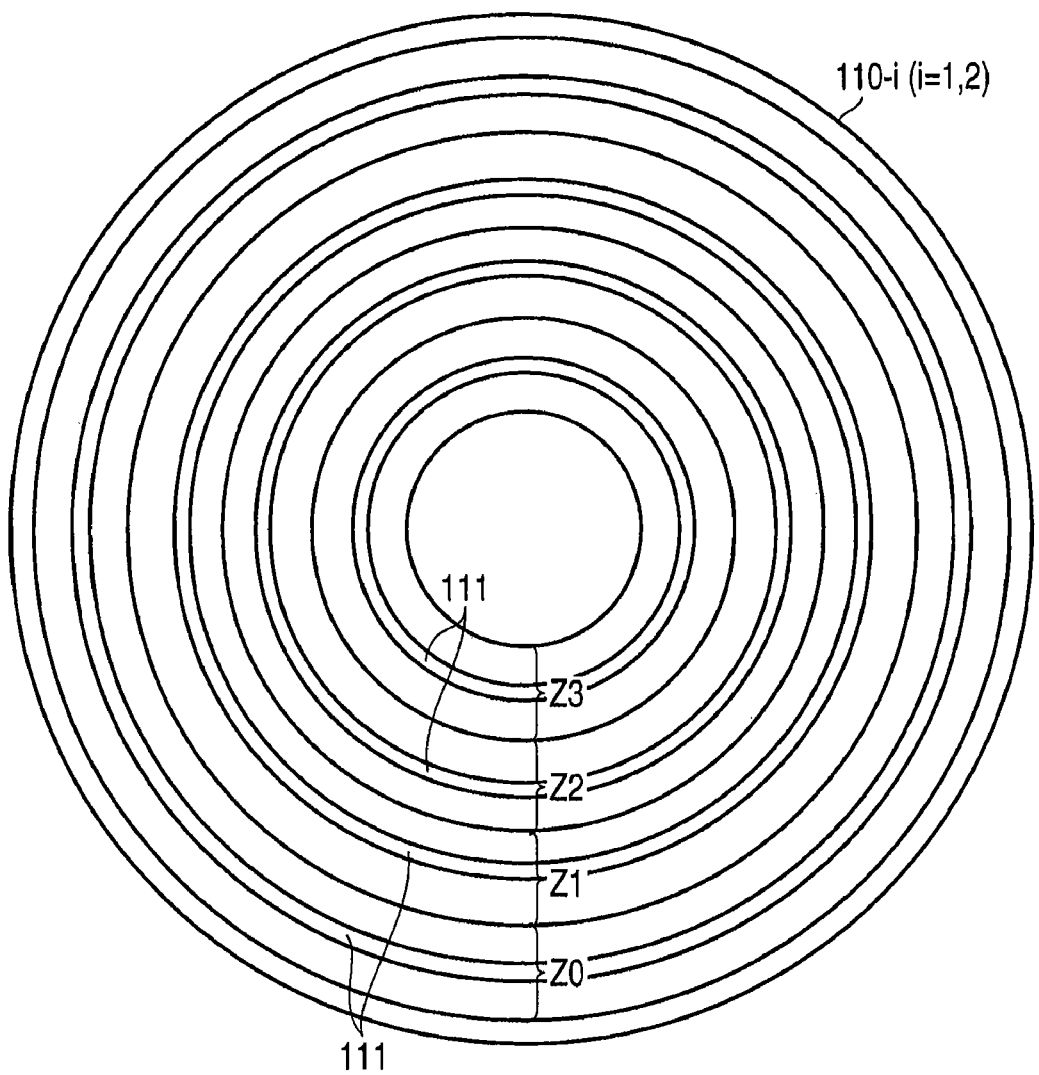
F I G. 2

FIG. 3

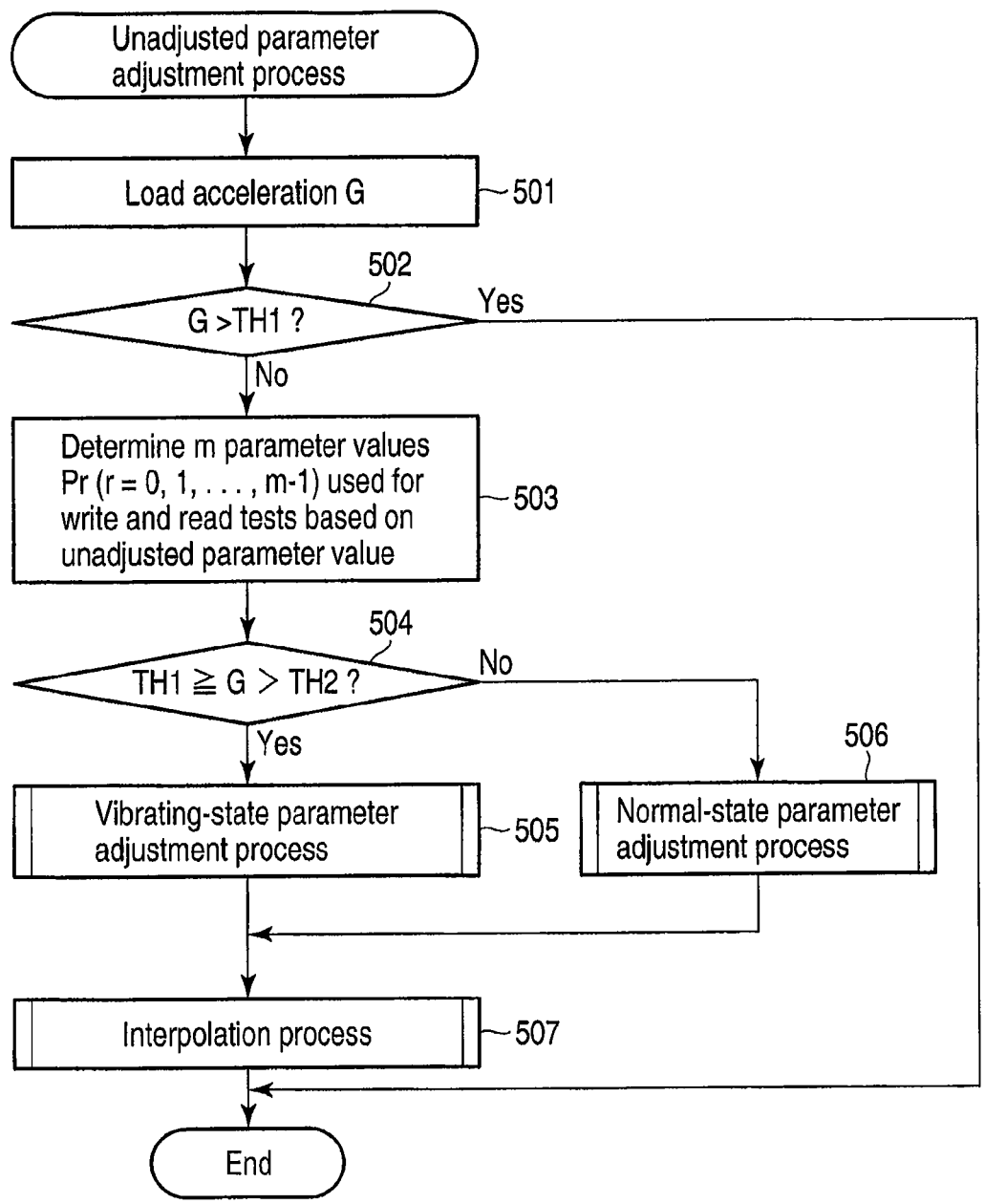
F I G. 5

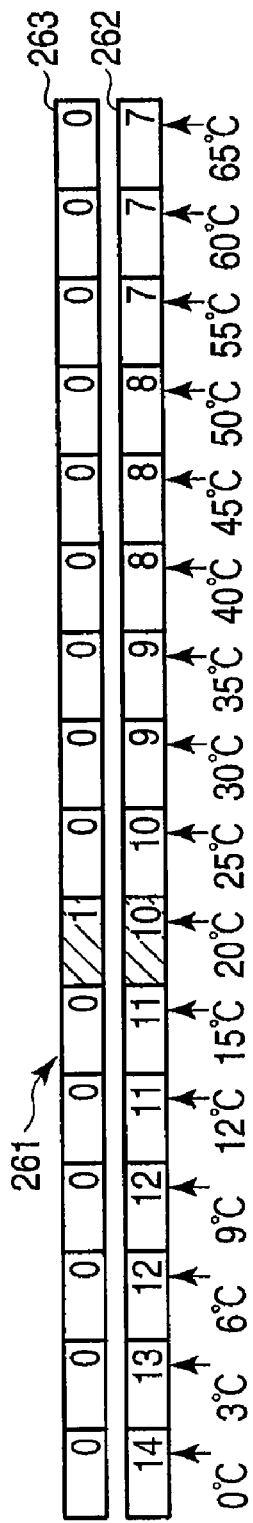
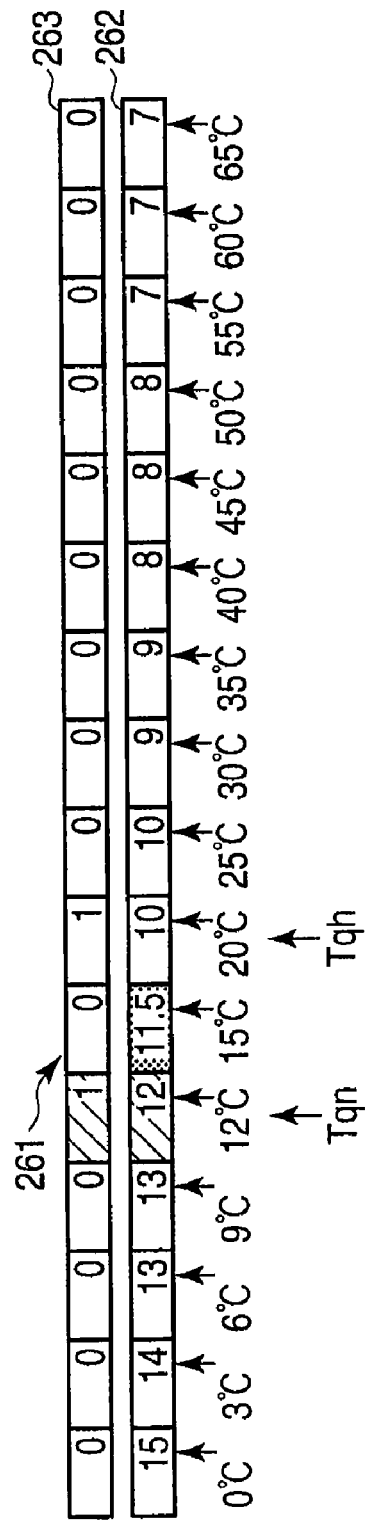
FIG.11A
FIG.11B

MAGNETIC DISK DRIVE AND METHOD FOR ADJUSTING PARAMETER IN THE SAME

CROSS-REFERENCE TO RELATED APPLICATIONS

This application is based upon and claims the benefit of priority from Japanese Patent Application No. 2010-143146, filed Jun. 23, 2010; the entire contents of which are incorporated herein by reference.

FIELD

Embodiments described herein relate generally to a magnetic disk drive and a method for adjusting a parameter in the magnetic disk drive.

BACKGROUND

In a magnetic disk drive, a head writes data to a disk (magnetic disk) serving as a recording medium and reads data stored on the disk. The write and read of data by the head is affected by the ambient temperature of the magnetic disk drive. Thus, the magnetic disk drive is generally designed to be always capable of performing the optimum write and read of data when the ambient temperature of the magnetic disk drive is within a predetermined range (for example, an operation-guaranteed temperature range).

According to this design, conditions for the optimum write and read are set depending on the ambient temperature of the magnetic disk. Parameters such as a write current and a write pre-compensation value are known as write and read conditions. Thus, to enable the optimum parameters to be set depending on the ambient temperature of the magnetic disk drive, a parameter table is used in which the optimum parameters are set in association with respective predetermined temperatures (or a temperature range) Ti (i=1, 2, ..., n). The parameter table is generally generated during a process of manufacturing a magnetic disk drive.

A long process time is required to generate a parameter table. Furthermore, relevant process facilities need to vary the ambient temperature. Thus, conventional techniques may omit setting of some temperatures Tj (for example, lower temperatures) and a process of acquiring the optimum parameters for temperatures Tj (that is, the adjusted parameters). However, if the magnetic disk drive is used at the ambient temperature for which the parameters have not been set yet, that is, for which the parameters are unadjusted, the efficiency of accesses from a host to the magnetic disk drive may decrease.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of electronic device comprising a magnetic disk drive according to a first embodiment;

FIG. 2 is a conceptual drawing showing an example of a format of a recording surface of a disk applied in the first embodiment;

FIG. 3 is a diagram showing an example of the data structure of a parameter management table applied in the first embodiment;

FIG. 5 is a flowchart showing an exemplary procedure for an unadjusted parameter adjustment process applied in the first embodiment;

FIGS. 11A and 11B are diagrams showing examples of a parameter management table obtained before and after the unadjusted parameter adjustment process;

DETAILED DESCRIPTION

Figure 4:
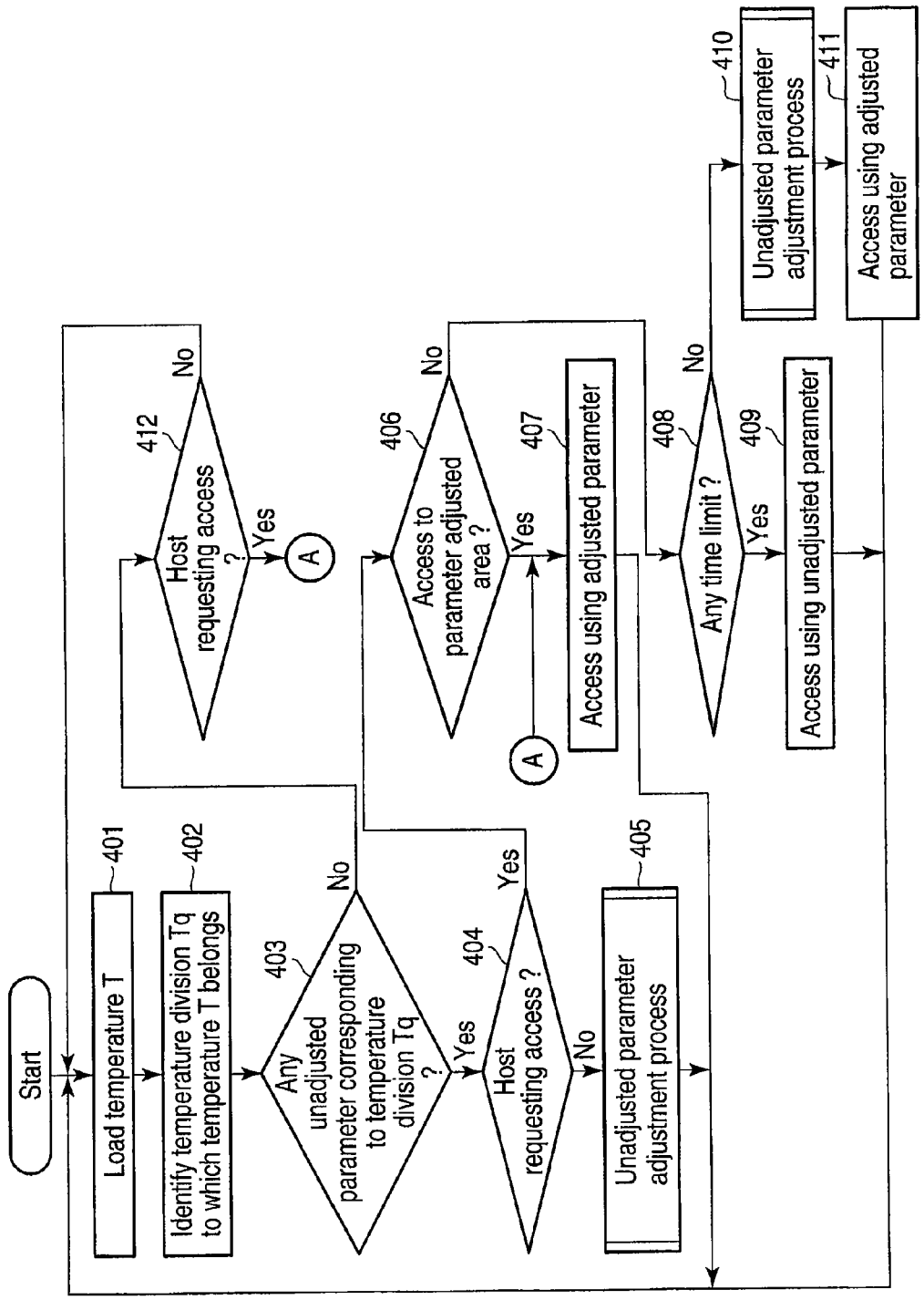
FIG. 4 is a flowchart illustrating an exemplary operation of the magnetic disk drive according to the first embodiment.

Various embodiments will be described hereinafter with reference to the accompanying drawings. In general, according to one embodiment, a magnetic disk drive comprises a parameter management table, a temperature detector, a parameter adjustment module and an interpolation module. The parameter management table is configured to store a parameter used to write data to a disk or read data from the disk in the parameter management table in association with each of a plurality of predetermined temperature divisions. The temperature detector is configured to detect an ambient temperature of the magnetic disk drive. The parameter adjustment module is configured to adjust a first parameter stored in the parameter management table in association with a first temperature division of the plurality of temperature divisions to a second parameter adapted for the first temperature division if the detected ambient temperature corresponds to the first temperature division and if the first parameter is unadjusted. The interpolation module is configured to update, by interpolation, an unadjusted third parameter corresponding to a third temperature division between the first temperature division and a second temperature division for which the parameter is adjusted based on a result of the adjustment of the first parameter.

First Embodiment

FIG. 1 is a block diagram showing an exemplary configuration of electronic device comprising a magnetic disk drive according to a first embodiment. In FIG. 1, the electronic device comprises a magnetic hard disk drive (HDD) 10 and a host (host system) 20. The electronic device is, for example, a personal computer, a video camera, a music player, a mobile terminal, or a mobile phone. The host 20 uses the HDD 10 as a storage device for the host 20. HDD 10 comprises a head disk assembly (HDA) unit 100 and a control board unit 200.

The HDA unit 100 comprises at least one disk, for example, two disks (magnetic disks) $110_{-1}$ and $110_{-2}$, a spindle motor (SPM) 130, an actuator 140, a head IC 150, a temperature detector 160, and a vibration detector 170.

Each of disks $110_{-1}$ and $110_{-2}$ comprises two recording surfaces, an upper recording surface and a lower recording surface. Disks $110_{-1}$ and $110_{-2}$ are spun at high speed by the SPM 130. A well known recording format called constant density recording (CDR) is applied to disk $110_{-i}$ (i=1, 2). Thus, each of the recording surfaces of disk $110_{-i}$ is divided into a plurality of zones in the radial direction of disk $110_{-i}$ for management. That is, disk $110_{-i}$ (more specifically, each recording surface of disk $110_{-i}$) comprises a plurality of zones.

FIG. 2 is a conceptual drawing showing an example of a format of the recording surface of disk $110_{-i}$. In the example in FIG. 2, for convenience of drawing, the recording surface of disk $110_{-i}$ is divided into four zones Z0 to Z3. However, the number of zones on the recording surface of disk $110_{-i}$ is not limited to four. Furthermore, in the first embodiment, zones Z0 to Z3 are applied in the CDR format. However, zones Z0 to Z3 may be set separately from zones applied in the CDR format.

Zone Zp (p=0, 1, 2, 3) in disk $110_{-i}$ comprises a parameter adjustment area 111 used for a parameter adjustment process for adjusting parameters used to write data to a user area in zone Zp or to read data from the user area in zone Zp. The parameter adjustment process applied in the first embodiment includes an operation of writing data to the parameter adjustment area 111, reading the data written to the parameter adjustment area 111, and calculating an error rate. This operation is performed with the parameters varied.

In the first embodiment, the parameter adjustment area 111 is assumed to lie in a middle circumferential portion in zone Zp and to comprise at least one data track. In this case, the parameters adjusted by the parameter adjustment process using the parameter adjustment areas 111 are expected to be optimum for all the data tracks in zone Zp.

However, the level of adverse effects of the position of the parameter adjustment area 111 on the parameters decreases with increasing number of zones per recording surface. Thus, the parameter adjustment areas 111 need not necessarily be positioned in the middle circumferential portion of zone Zp. For example, if the number of zones per recording surface of disk $110_{-i}$ is sufficiently large, the parameter adjustment area 111 may be positioned on the inner or outer circumferential side of zone Zp. Furthermore, the parameter adjustment area 111 may be a partial area of one data track. That is, the parameter adjustment area 111 may comprise data sectors the number of which is smaller than that of data sectors per data track.

FIG. 1 is referred to again. An actuator 140 comprises heads (magnetic heads) $120_{-0}$ and $120_{-1}$ each provided at the tip of a head arm located over the corresponding recording surface of disk $110_{-1}$. The actuator 140 further comprises heads $120_{-2}$ and $120_{-3}$ each provided at the tip of a head arm located over the corresponding recording surface of disk $110_{-2}$. Heads $120_{-0}$ and $120_{-1}$ are used to write and read data to and from disk $110_{-1}$. Heads $120_{-2}$ and $120_{-3}$ are used to write and read data to and from disk $110_{-2}$.

The actuator 140 comprises a voice coil motor (VCM) 141. The actuator 140 is driven by the VCM 141 to move heads $120_{-0}$ to $120_{-3}$ in the radial direction of disks $110_{-1}$ and $110_{-2}$. The SPM 130 and VCM 141 are driven by driving currents (SPM current and VCM current) supplied by a motor driver IC 210 described below. The head IC 150 amplifies a signal read by head $120_{-j}$ (j=0, 1, 2, 3) (that is, a read signal). The head IC 150 also converts write data transferred by a read/write channel 230 described below, into a write current. The head IC 150 further outputs the write current to head $120_{-j}$.

The temperature detector 160 detects the temperature (ambient temperature) T of the environment in which the HDD 10 is used. The vibration detector 170 detects external vibration applied to the HDD 10. More specifically, the vibration detector 170 comprises an acceleration sensor to detect vibration based on the acceleration of the vibration sensed by the acceleration sensor. At least one of the temperature detector 160 and the vibration detector 170 may be provided inside the control board unit 200 or outside the HDA unit 100 and the control board unit 200.

The control board unit 200 comprises two LSIs, a motor driver IC 210 and a system LSI 220. The motor driver IC 210 drives the SPM 130 at a constant rotational speed. The motor driver IC 210 also supplies the VCM 141 with a current (VCM current) with a value corresponding to a VCM operation amount specified by a CPU 280, to drive the actuator 140.

The system LSI 220 is what is called a system-on-chip (SOC) comprising the read/write (R/W) channel 230, a disk controller (HDC) 240, buffer RAM 250, flash memory 260, program ROM 270, CPU 280, and RAM 290 all of which are integrated on a single chip.

The R/W channel 230 is a well-known signal processing device configured to execute signal processing for reads and writes. The R/W channel 230 digitalizes a read signal, and decodes read data from the digitalized data. The R/W channel 230 also extracts servo data required to position head $120_{-j}$, from the digital data. The R/W channel 230 also codes write data.

The HDC 240 is connected to the host 20 via a host interface 21. The HDC 240 loads commands (a write command, a read command, and the like) transferred by the host 20. The HDC 240 controls the data transfer between the host 20 and the HDC 240. The HDC 20 controls the data transfer executed between disk $110_{-i}$ (i=1, 2) and the HDC 240 via the R/W channel 230.

The buffer RAM 250 is used to temporarily store data to be written to disk $110_{-i}$ and data read from disk $110_{-i}$ via the head IC 150 and the R/W channel 230. The flash memory 260 is a rewritable nonvolatile memory. The flash memory 260 is used to store a parameter management table 261. The parameter management table 261 will be described below.

The program ROM 270 is configured to pre-store a control program (firmware). The control program may be stored in a partial area of the flash memory 260. The CPU 280 functions as a main controller for the HDD 10. The CPU 280 controls at least some other elements in the HDD 10 in accordance with the control program stored in the program ROM 270. A partial area of the RAM 290 is used as a work area for the CPU 280. When the HDD 10 is powered on, the parameter management table 261 stored in the flash memory 260 is loaded into the work area.

Figure 3:
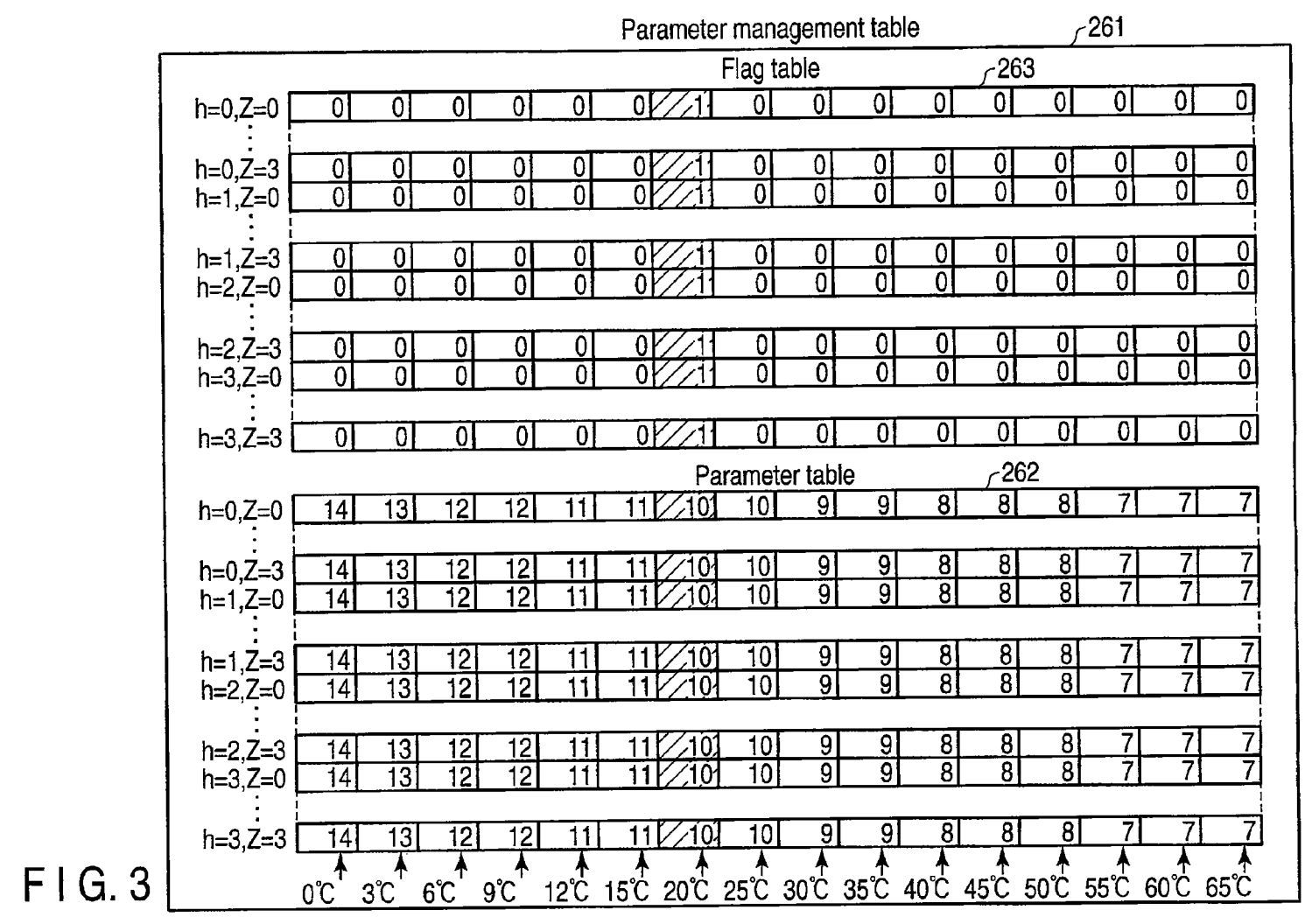

FIG. 3 shows an example of the data structure of the parameter management table 261. The parameter management table 261 comprises a parameter table 262 and a flag table 263. The parameter table 262 stores parameters in association with a plurality of predetermined temperature divisions Tq (q=1, 2, ..., n) for each head $120_{-j}$ (j=0, 1, 2, 3) corresponding to the recording surface of each of disks $110_{-1}$ and $110_{-2}$ and for each zone Zp (p=0, 1, 2, 3). In the first embodiment, if the temperature detector 160 detects a temperature T, which of the plurality of temperature divisions Tq the temperature T corresponds to is determined.

In the first embodiment, the parameters are associated not only with temperature divisions Tq but also with head $120_{-j}$ and zone Zp. This is due to consideration for a variation in the write and read characteristics of the HDD 10 dependent not only on temperature division Tq but also on head 120-$_j$ and zone Zp. However, the parameters may be associated only with temperature division Tq or with a combination of temperature division Tq and one of head 120-$_j$ and zone Zp.

In the first embodiment, head 120-$_j$ is assigned a head number h (h=j), and zone Zp is assigned a zone number z (z=p). That is, the parameter table 262 stores the parameters in association with the plurality of temperature divisions Tq for each combination of head number h (h=0, 1, 2, 3) and zone number z (z=0, 1, 2, 3). For simplification of description, the parameter table 262 shown in FIG. 3 is assumed to contain only one type of parameter, a write current. However, the parameter table 262 may contain a write pre-compensation value as another type of parameter.

The flag table 263 stores flags F in association with the plurality of temperature divisions Tq for each head 120-$_j$ (j=0, 1, 2, 3) corresponding to the recording surface of each of disks 110-$_1$ and 110-$_2$ and for each zone Zp. That is, the flag table 263 stores the flags F in association with the plurality of temperature divisions Tq for each combination of head number h (h=0, 1, 2, 3) and zone number z (z=0, 1, 2, 3).

The flags stored in the flag table 263 in association with a combination of head 120-$_j$ (h=j), zone Zp (z=p), and temperature division Tq indicate whether or not each of the parameters stored in the parameter table 262 and corresponding to the combination (h, z, Tq) is adjusted or unadjusted (that is, whether or not the parameter has been adjusted). In the example shown in FIG. 3, a flag F of 1 indicates that the corresponding parameter is adjusted. A flag F of 0 indicates that the corresponding parameter is unadjusted. Temperature division Tq corresponding to the flag F indicating that the parameter is adjusted is hereinafter referred to as an adjusted point. Temperature division Tq corresponding to the flag F indicating that the parameter is unadjusted is hereinafter referred to as an unadjusted point.

In the example shown in FIG. 3, for convenience of drawing, the temperature interval between adjacent temperature divisions Tq and Tq+1 is set to be relatively large. However, in the first embodiment, the temperature divisions are assumed to be set in such detail that even if for example, the temperature T detected by the temperature detector 160 belongs (that is, corresponds) to temperature division Tq, normal reads and writes can be achieved by using the parameter associated with adjacent temperature division Tq−1 or Tq+1. In this case, the parameter associated with temperature division Tq to which the detected temperature belongs can be directly used without, for example, a linear interpolation process. This allows the parameter value used for read or write to be prevented from deviating from the optimum value.

Furthermore, in the example in FIG. 3, integers are used as the parameters stored in the parameter management table 261 (parameter table 262) for simplification. However, in order to allow an interpolation process described below to be more precisely executed, numerical values with decimal points may be used as the parameters stored in the parameter management table 261. However, a register used to set parameters for disk accesses generally holds integral values. Thus, if parameters of numerical values with decimal points are used, the integral parts of the parameters may be set in the register. In this case, for example, the temperature divisions may be set based on a temperature difference corresponding to the resolution (that is, the numerical value 1) of the register. If such a temperature division is applied, reads and writes are expected to be normally executed even if the parameter associated with the adjacent temperature division is used. However, a temperature difference corresponding to a numerical value greater than 1 may be used for the temperature division.

The parameter management table 261 shown in FIG. 3 is in a state prevailing when the HDD 10 with the parameter management table 261 is shipped. In the example in FIG. 3, the flag table 263 in the parameter management table 261 shows that for the combinations (h, z) of head numbers h of 0 to 3 (heads 120-$_0$ to 120-$_3$) and zone numbers z of 0 to 3 (zones Z0 to Z3), only one of the parameters for respective temperature divisions Tq which corresponds to temperature division Tq for 20° C. (what is called the normal temperature) is adjusted. The flag table 263 also shows that for these combinations (h, z), the parameters corresponding to all the temperature divisions Tq other than the one for 20° C. are unadjusted.

Thus, in the first embodiment, in the process of manufacturing the HDD 10, only the parameter corresponding to the temperature division for 20° C. is adjusted for each combination (h, z) of head number h and zone number z. For the parameters corresponding to all the temperature divisions other than the one for 20° C., a predetermined default value (temporary value) may be used as an unadjusted parameter. The parameter adjustment in the process of manufacturing the HDD 10 may be executed on a temperature division other than the one for 20° C., for example, one for 60° C. or on at least two temperature divisions for, for example, 20 and 60° C.

Now, the operation of the HDD 10 in the electronic device shown in FIG. 1 will be described with reference to a flowchart in FIG. 4. First, when the HDD 10 is powered on, the parameter management table 261 stored in the flash memory 260 is loaded into the RAM 290 under the control of the CPU 280. Thus, it is hereinafter assumed that the parameter management table 261 is stored in the RAM 290.

When the HDD 10 is on, the CPU 280 steadily loads the temperature detected by the temperature detector 160 (that is, the ambient temperature of the HDD 10) T (block 401). The CPU 280 then determines to which of the plurality of temperature divisions Tq the temperature T belongs (block 402).

Then, the CPU 280 references the flag table 263 in the parameter management table 261 stored in the RAM 290 to determine whether or not there is any unadjusted parameter corresponding to temperature division Tq (block 403). If there is any unadjusted parameter corresponding to temperature division Tq (Yes in block 403), the CPU 280 determines whether or not the host 20 has been requesting a disk access (block 404).

If the host 20 has not been requesting any disk access (No in block 404), the CPU 280 operates as a parameter adjustment module to execute an unadjusted parameter adjustment process (block 405). The unadjusted parameter adjustment process will be described below. Upon executing the unadjusted parameter adjustment process, the CPU 280 returns to block 401. In contrast, if the host 20 has been requesting a disk access (Yes in block 404), the CPU 280 determines whether or not the access is targeted at a parameter adjustment area (block 406). The parameter adjustment area refers to the area for which the parameter used to access the area is adjusted.

If the access is targeted at the parameter adjustment area (Yes in block 406), the CPU 280 uses the corresponding adjusted parameter to execute the disk access requested by the host 20 (block 407). Here, it is assumed that the area to be accessed which is specified by the host 20 belongs to zone Zp on the recording surface of disk 110-$_i$ (the recording surface corresponding to head 120-$_j$ with head number h). Zone Zp is specified by the combination (h, z) of head number h and zone number z. In this case, an adjusted parameter is used which is stored in the parameter management table 261 (parameter table 262) in association with the combination (h, z, Tq) of head number h, zone number z, and temperature division Tq. Upon executing block 407, the CPU 280 returns to block 401.

In the first embodiment, the number of parameter groups stored in the parameter management table 261 in association with temperature divisions Tq is 16, which is equal to the number of combinations of head number h (h=0, 1, 2, 3) and zone number z (z=0, 1, 2, 3). Thus, even though some of the 16 parameters are unadjusted, the parameter corresponding to the area to be accessed may are adjusted. That is, even though the determination in block 403 is Yes, the determination in block 406 may be Yes.

On the other hand, if the access is not targeted at the parameter adjustment area (No in block 406), the CPU 280 operates as a selector. Then, the CPU 280 (selector) determines whether the access request from the host 20 specifies a limit time, that is, the access request has a time limit (block 408).

If the access has a time limit (Yes in block 408), then in order to give top priority to the disk access, the CPU 280 (selector) uses the corresponding unadjusted parameter to execute the disk access requested by the host 20 (block 409). That is, the CPU 280 (selector) selects the disk access. Thus, even though the unadjusted parameter adjustment process is being executed, the disk access requested by the host 20 and having the time limit can be performed at high speed.

Here, if the disk access using the unadjusted parameter is a write access, the CPU 280 may operate as a controller to switch the write access to write verify. The write verify herein is a process of reading the data written to disk 110-$_i$ using the unadjusted parameter and checking whether or not the read data matches the write data. By switching to the write verify, the CPU 280 can confirm that the data using the unadjusted parameter has been written correctly and ensure that the correctly written data is read. Upon executing the selected disk access (block 409), the CPU 280 returns to block 401.

In contrast, if the access has no time limit (No in block 408), the CPU 280 (selector) selects an unadjusted parameter adjustment process similar to that in block 405 described above. Then, the CPU 280 operates as a parameter adjustment module to execute the selected unadjusted parameter adjustment process (block 410). Upon executing the selected unadjusted parameter adjustment process (block 410), the CPU 280 uses the corresponding parameter adjusted by the unadjusted parameter adjustment process to perform the disk access requested by the host 20 (block 411). Upon executing block 411, the CPU 280 returns to block 401.

Furthermore, if there is no unadjusted parameter corresponding to temperature division Tq (No in block 403), that is, all the parameters corresponding to temperature division Tq are adjusted, the CPU 280 determines whether or not the host 20 has been requesting a disk access (block 412) as is the case with block 404 described above. If the host has not been requesting any disk access (No in block 412), the CPU 280 returns to block 401. In contrast, if the host 20 has been requesting a disk access (Yes in block 412), the CPU 280 uses the corresponding adjusted parameter (that is, the optimum parameter) to execute the disk access requested by the host 20 (block 407) as is the case where the determination in block 406 described above is Yes. Thus, the disk access requested by the host 20 can be executed under the optimum conditions.

The unadjusted parameter adjustment process executed in blocks 405 and 410 described above is finished every time one unadjusted parameter is adjusted which corresponds to a combination of temperature division Tq to which the temperature T determined in block 402 belongs with head number h (h=0, 1, 2, 3) and zone number z (z=0, 1, 2, 3), though this is not clearly shown in the flowchart in FIG. 4. Thus, even if the host 20 consecutively performs disk accesses (particularly disk accesses with time limits), the disk accesses can be processed at high speed. As a result, the adverse effects of the unadjusted parameter adjustment process on the host 20 can be minimized.

Now, a procedure for the unadjusted parameter adjustment process executed in blocks 405 and 410 described above will be described with reference to a flowchart in FIG. 5. For simplification, it is hereinafter assumed that the unadjusted parameter to be adjusted corresponds to temperature division Tq for the combination of head 120-$_0$ with head number h of 0 and zone Z0 with zone number z of 0. Furthermore, the value of the unadjusted parameter (that is, the unadjusted parameter value) is denoted by P.

First, the CPU 280 (parameter adjustment module) loads the acceleration G of vibration detected by the vibration detector 170 (more specifically, the acceleration sensor in the vibration detector 170) (block 501). The acceleration G loaded by the CPU 280 is indicative of the level of vibration applied to the HDD 10. The CPU 280 determines whether or not the acceleration (vibration level) is greater than a first threshold TH1 (block 502). If the environment is so poor that the acceleration G exceeds the threshold TH1 (Yes in block 502), the CPU 280 determines that the acceleration (vibration) applied to the HDD 10 is improper for adjustment of the unadjusted parameter. The CPU 280 then terminates the unadjusted parameter adjustment process without adjusting the unadjusted parameter.

In contrast, if the acceleration G is not greater than the threshold TH1 (No in block 502), the CPU 280 determines m parameter values Pr (r=0, 1, . . . , m−1) to be used for write and read tests based on the unadjusted parameter P in order to adjust the unadjusted parameter (block 503). In the first embodiment, for simplification of description, it is assumed that m is 5 and that five parameter values P0, P1, P2, P3, and P4 used for the write and read tests are P−2α, P−α, P, P+α, and P+2α, respectively, where α is a predetermined adjustment step. A smaller value may be used for α to increase the number m of parameters.

Then, the CPU 280 determines whether or not the acceleration G is equal to or smaller than the first threshold TH1 but is greater than a second threshold TH2 smaller than the first threshold Th1 (block 504). If the determination in block 504 is Yes (TH1≧G>TH2), the CPU 280 determines that although the HDD is vibrated, the unadjusted parameter can be adjusted by modifying the adjustment method. In this case, the CPU 280 executes a vibrating-state parameter adjustment process described below and in which a special adjustment method is applied to adjustment of the unadjusted parameter (block 505).

In contrast, if the determination in block 504 is No (G≦TH2), the CPU 280 determines that the HDD 10 is not vibrated and that the unadjusted parameter can be adjusted by the normal method. In this case, the CPU 280 executes a normal-state parameter adjustment process described below (block 506).

Upon executing the vibrating-state parameter adjustment process (block 505) or normal-state parameter adjustment process (block 506), the CPU 280 operates as an interpolation module to execute an interpolation process described below (block 507). Thus, the unadjusted parameter adjustment process is finished.

Figure 6:
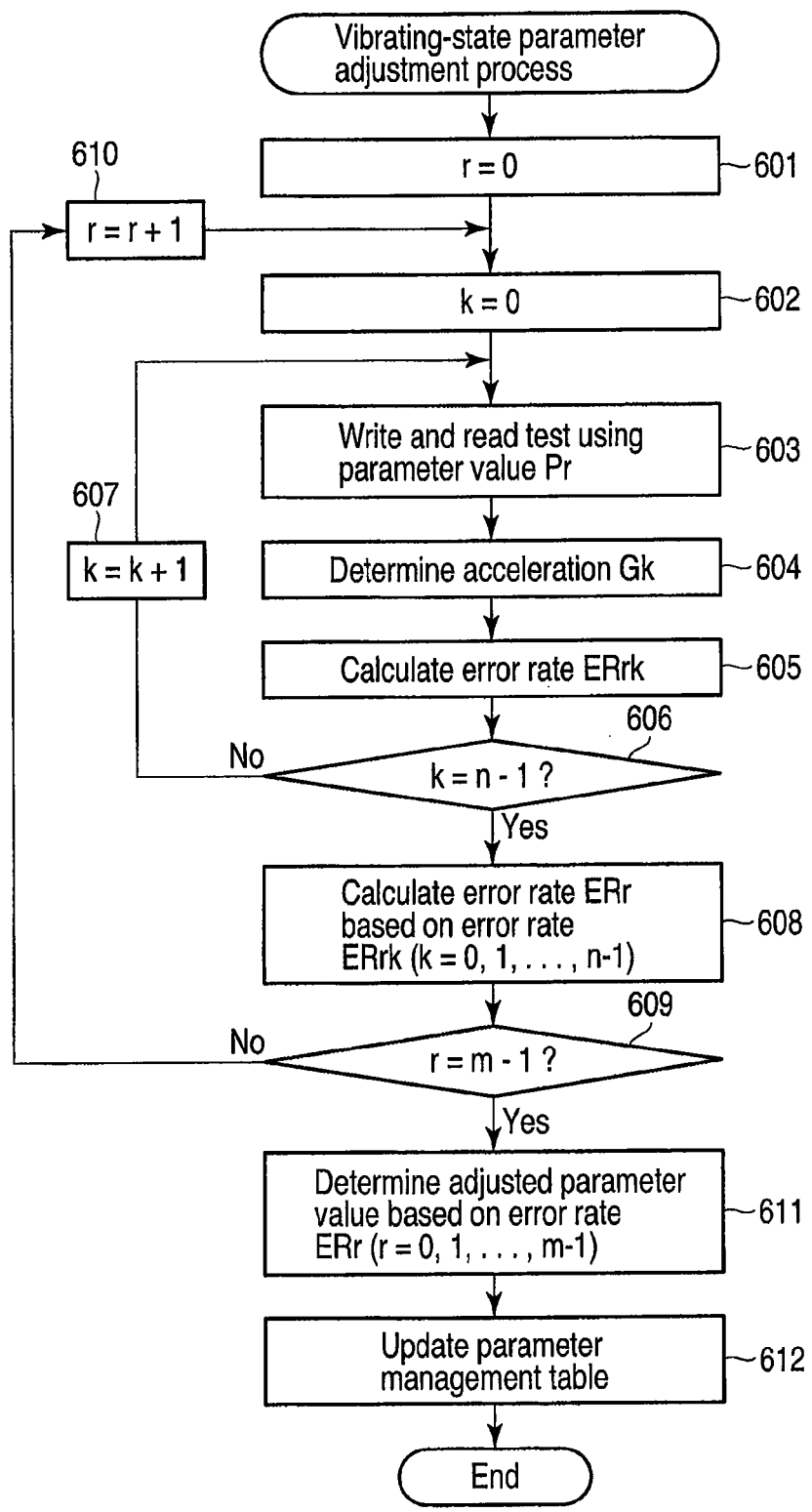
FIG. 6 is a flowchart showing an exemplary procedure for a vibrating-state parameter adjustment process applied in the first embodiment.

Now, a procedure for the vibrating-state parameter adjustment process executed in block 505 described above will be described with reference to a flowchart in FIG. 6. First, the CPU 280 (parameter adjustment module) initializes a variable r used to specify the parameter value Pr, to zero (block 601). Then, the CPU 280 initializes a variable k to zero, variable k being used to count the number of write and read tests when n write and read tests are executed using the parameter value Pr (block 602).

Then, the CPU 280 executes a read and write test using the parameter value Pr specified by variable r (block 603). Here, the unadjusted parameter to be adjusted corresponds to temperature division Tq for the combination of head $120_{-0}$ with head number h of 0 and zone Z0 with zone number z of 0 as described above. In this case, the write and read test is executed as described below using the parameter adjustment area 111 provided in zone Z0 of the recording surface of disk $110_{-1}$ corresponding to head $120_{-0}$. First, test data is written to the parameter adjustment area 111. Then, the data is read from the parameter adjustment area 111. After this write and read operation, the CPU 280 compares the test data written to the parameter adjustment area 111 with the data read from the parameter adjustment area 111 to detect the number of error bits. The CPU 280 repeats the above-described operation a predetermined number of times (for example, 10 times).

Then, the CPU 280 determines an acceleration Gk during the k-th write and read test executed using the parameter value Pr (block 603). In the first embodiment, the CPU 280 loads the acceleration G from the vibration detector 170 in each of a predetermined number of write and read operations performed during the k-th write and read test. The CPU 280 determines the average value of the loaded accelerations G to be the acceleration Gk for the k-th write and read test.

Then, based on the results of the predetermined number of write and read operations, the CPU 280 calculates an error rate ERrk for the k-th write and read test executed using the parameter value Pr (block 605). The order in which blocks 604 and 605 are executed may be opposite to that in the first embodiment. Then, the CPU 280 determines whether or not variable k is equal to n−1 (block 606). If variable k is not equal to n−1 (No in block 606), the CPU 280 determines that the number of write and read tests executed using the parameter value Pr has not reached n. In this case, the CPU 280 increments variable k by one (block 607), and returns to block 603.

In contrast, if variable k is equal to n−1 (Yes in block 606), the CPU 280 determines that the write and read test using the parameter value Pr has been executed n times. In this case, based on the error rates ERrk (k=0, 1, . . . , n−1) acquired from the n write and read tests, the CPU 280 calculates the error rate ERr resulting from the use of the parameter value Pr (block 608). In the first embodiment, the error rate ERr is calculated using a weighted average calculation, so as to reduce the adverse effects of the error rate exerted when the acceleration Gk is high. For example, the CPU 280 calculates the error rate ERr in accordance with:

$$ER_r = \Sigma(ER_{rk}/G_k)/\Sigma(1/G_k)$$

Then, the CPU 280 determines whether or not variable r is equal to m−1 (block 609). If variable r is not equal to m−1 (No in block 609), the CPU determines that the write and read tests using the m parameter values Pr have not been completed. In this case, the CPU 280 increments variable r by one (block 610), and returns to block 602.

In contrast, if variable r is equal to m−1 (Yes in block 609), the CPU 280 determines that the write and read tests using them parameter values Pr have been completed. In this case, the CPU 280 determines the optimum parameter value, that is, the adjusted parameter value, based on the error rates ERr (r=0, 1, . . . , m−1) acquired from the write and read tests using the m parameter values Pr (block 611). Here, it is assumed that the adjusted parameter value is determined to be the parameter value Pr corresponding to the lowest one of the m error rates ERr.

The CPU 280 updates the parameter management table 261 based on the determined adjusted parameter value (block 612). Here, the following is updated to the adjusted parameter value determined in block 611: the unadjusted parameter stored in the parameter table 262 in the parameter management table 261 in association with head number h=0, zone number z=0, and temperature division Tq. Furthermore, the following is updated from a status indicating that the parameter is unadjusted (F=0) to a status indicating that the parameter is adjusted (F=1): the flag F stored in the parameter table 262 in the parameter management table 261 in association with head number h=0, zone number z=0, and temperature division Tq. Upon executing block 612, the CPU 280 finishes the vibrating-state parameter adjustment process. The parameters adjusted by the vibrating-state parameter adjustment process can be excluded from targets for a table saving process described below.

Figure 7:
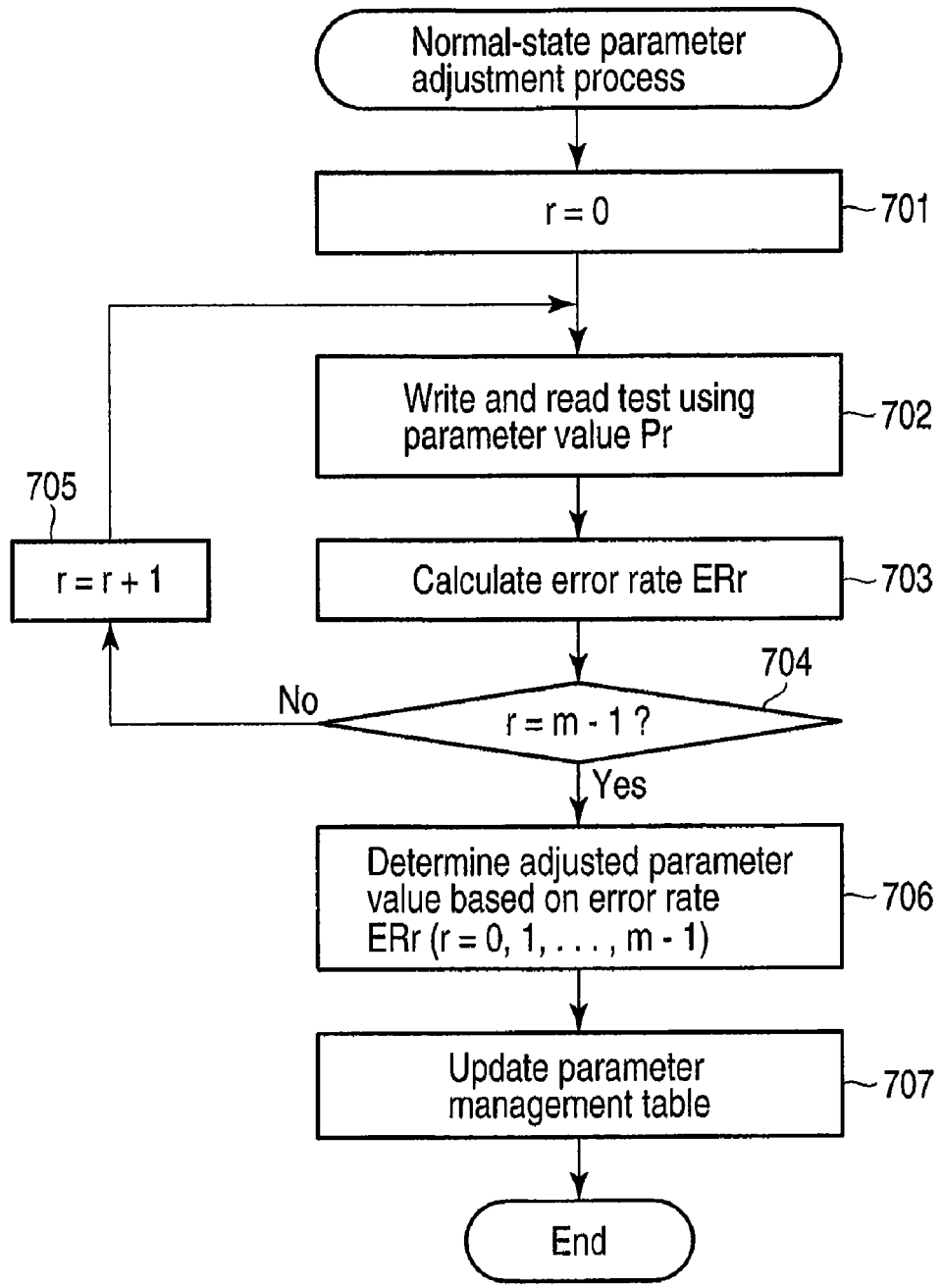
FIG. 7 is a flowchart showing an exemplary procedure for a normal-state parameter adjustment process applied in the first embodiment.

Now, a procedure for the normal-state parameter adjustment process executed in block 506 described above will be described with reference to a flowchart in FIG. 7. Portions of the flowchart in FIG. 7 which are equivalent to those of the flowchart in FIG. 6 will not be described below. First, the CPU 280 (parameter adjustment module) initializes variable r to zero (block 701). The CPU 280 then uses the parameter value Pr specified by variable r to execute a write and read test (block 702). That is, the CPU 280 performs a predetermined number of write and read operations as is the case with block 603 described above.

Then, based on the results of the write read test in block 702, the CPU 280 calculates the error rate ERr for the write error test using the parameter value Pr (block 703). The CPU 280 then determines whether or not variable r is equal to m−1 (block 704). If variable r is not equal to m−1 (No in block 704), the CPU 280 increments variable r by one (block 705), and returns to block 702.

In contrast, if variable r is equal to m−1 (Yes in block 704), the CPU 280 determines the adjusted parameter value based on the error rates ERr (r=0, 1, . . . , m−1) acquired from the write and read tests using the m parameter values Pr (block 706). The CPU 280 updates the parameter management table 261 based on the determined adjusted parameter value (block 707). The CPU 280 thus finishes the normal-state parameter adjustment process.

Figure 8:
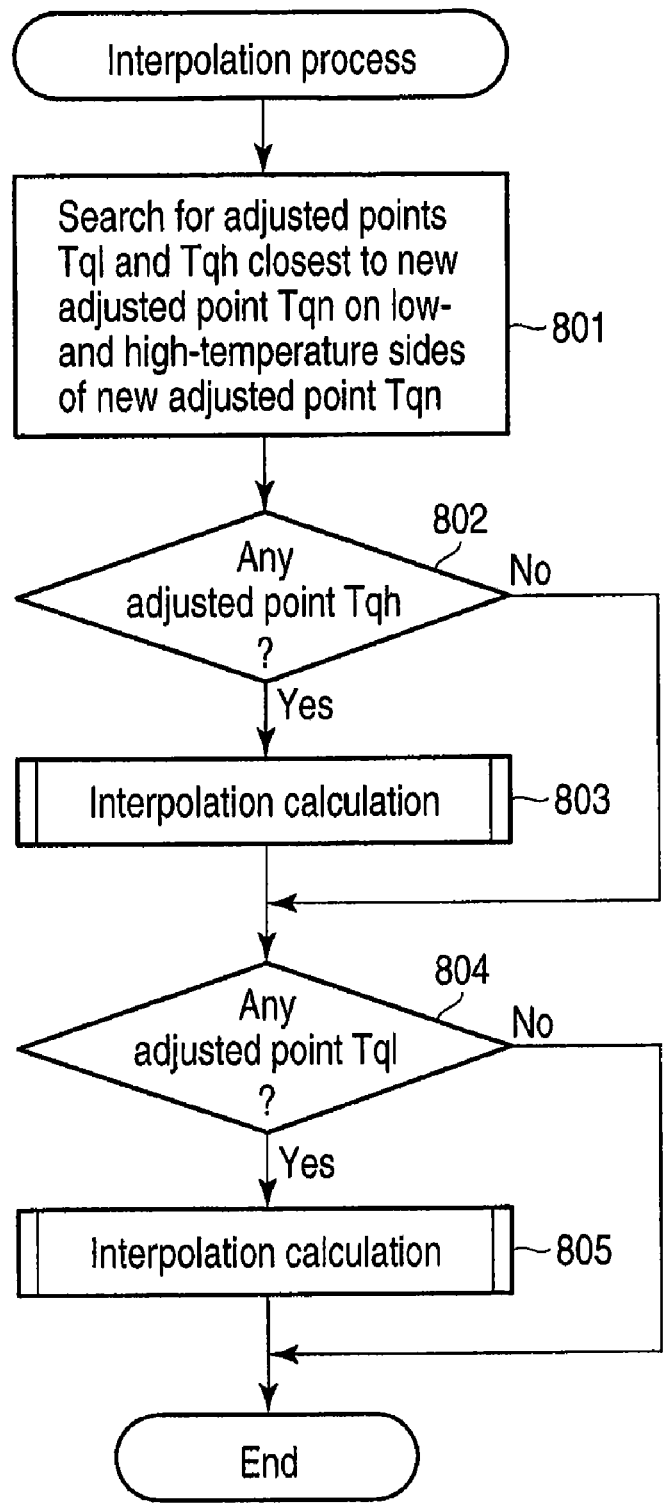
FIG. 8 is a flowchart of an exemplary procedure for an interpolation process applied in the first embodiment.

Now, a procedure for the interpolation process executed in block 507 described above will be described with reference to a flowchart in FIG. 8. In the interpolation process, a new adjusted point denoted by Tqn refers to temperature division (first temperature division) Tq with which the flag F is associated, the flag F being updated so as to indicate the adjusted status in a preceding vibrating-state parameter adjustment process (block 505) or a preceding normal-state parameter adjustment process (block 506).

First, the CPU 280 (interpolation module) references the parameter management table 261 to search for an adjusted point closest to new adjusted point Tqn on each of a low-temperature side and a high-temperature side of new adjusted point Tqn (block 801). The adjusted point closest to new adjusted point Tqn on the low-temperature side is denoted by Tql. The adjusted point closest to new adjusted point Tqn on the high-temperature side is denoted by Tqh. Furthermore, temperature divisions Tq between adjusted point Tql or Tqh and new adjusted point Tqn (that is, temperature divisions Tq corresponding to unadjusted parameters) are hereinafter referred to as unadjusted points and denoted by Tqk.

Then, based on the result of the search in block 801, the CPU 280 determines whether or not there is any adjusted point, for example, on the high-temperature side of new adjusted point Tqn (block 802). If the determination in block 802 is Yes, the CPU 280 executes an interpolation calculation for interpolating the unadjusted parameter values for unadjusted points Tqk (k=1, 2, . . . , N) between new adjusted point Tqn and high-temperature-side adjusted point Tqh (block 803). The interpolation calculation will be described below in detail. Here, N denotes the number of unadjusted points Tqk between adjusted point Tqh and new adjusted point Tqn.

Upon executing block 803, the CPU proceeds to block 804. On the other hand, if the determination in block 802 is No, the CPU 280 skips block 803 to proceed to block 804. In block 804, based on the result of the search in block 801, the CPU 280 determines whether or not there is any adjusted point Tql on the low-temperature side of new adjusted point Tqn.

If the determination in block 804 is Yes, the CPU 280 executes an interpolation calculation similar to that in block 803 in order to interpolate the unadjusted parameter values of unadjusted points Tqk (k=1, 2, . . . , N') between new adjusted point Tqn and low-temperature-side adjusted point Tql (block 805). Here, N' denotes the number of unadjusted points Tqk between adjusted point Tql and new adjusted point Tqn. Upon executing block 805, the CPU 280 terminates the interpolation process. Furthermore, if the determination in block 804 is No, the CPU 208 skips block 805 to terminate the interpolation process.

Now, a processing procedure for the interpolation calculation executed in block 803 described above will be described with reference to a flowchart in FIG. 9. The adjusted parameter value for new adjusted point Tqn is hereinafter denoted by Paa. The original value (unadjusted parameter value) corresponding to the adjusted parameter value Paa is hereinafter denoted by Pba. The unadjusted parameter value for unadjusted point Tqk is hereinafter denoted by Pbak. First, the CPU 280 (interpolation module) calculates (block 901) the difference D between adjusted parameter value Paa for new adjusted point Tqn and unadjusted parameter value Pba in accordance with:

$$D=Paa-Pba$$

where the difference D has a code bit indicative of positivity or negativity and is indicative of the amount of change (more specifically, the amount of increase or decrease) in adjusted parameter value Paa with respect to the unadjusted parameter value Pba.

Then, the CPU 280 references the parameter management table 261 to acquire the number N of unadjusted points Tqk between adjusted point Tqh and new adjusted point Tqn (block 902). Here, the value k of the N unadjusted points Tqk (k=1, 2, . . . , N) is assumed to decrease consistently with the distance to adjusted point Tqh. Then, the CPU 280 calculates (block 903) a unit correction amount ADJ in accordance with:

$$ADJ=D/(N+1)$$

The CPU 280 then adds the correction amount ADJ*k (that is, the unit correction amount ADJ multiplied by k) to the unadjusted parameter value Pbak for unadjusted point Tqk (k=1, 2, . . . , N) (block 904). In other words, the CPU 280 updates the unadjusted parameter values Pbak stored in the parameter table 262 in the parameter management table 261 in association with temperature divisions Tqk, by adding the correction amount ADJ*k to the unadjusted parameter values Pbak.

$$Pbak=Pbak+ADJ*k$$

At this time, in the first embodiment, the statuses of the flags F stored in the flag table 263 in the parameter management table 261 in association with respective temperature divisions Tqk are not updated, indicating that the parameters corresponding to the flags F are still unadjusted. However, the parameters corresponding to the flags F have been corrected based on the correction amount ADJ*k by the interpolation process and are thus substantially adjusted.

Figure 9:
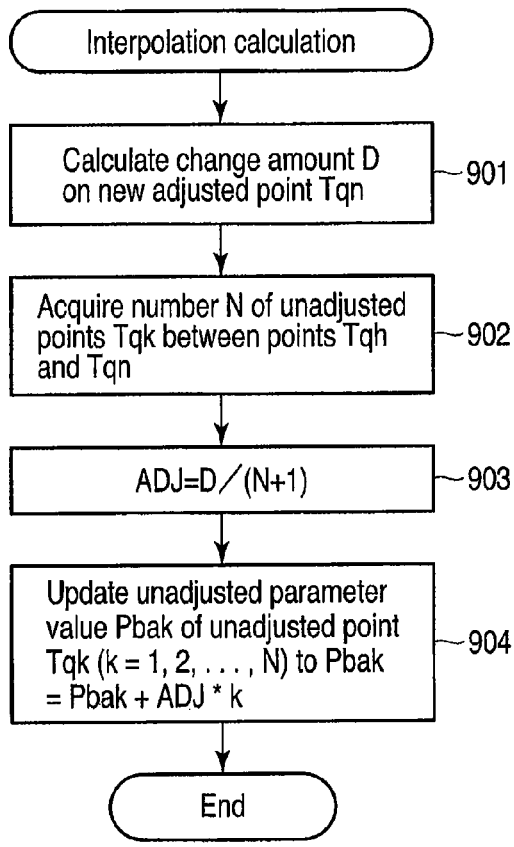
FIG. 9 is a flowchart of an exemplary procedure for an interpolation calculation applied in the first embodiment.

The interpolation process executed in block 805 can be executed in accordance with a procedure similar to that in the flowchart in FIG. 9. In the description of the procedure for the interpolation process in accordance with the flowchart in FIG. 9, adjusted point Tqh may be replaced with adjusted point Tql, and N may be replaced with N' as required.

As described above, according to the first embodiment, if the parameter corresponding to point (temperature division) Tqn is adjusted, the interpolation process based on the results of the parameter adjustment for point Tqn can be used to substantially adjust the unadjusted parameter values for unadjusted points Tqk (k=1, 2, . . . , N) between point (that is, new adjusted point) Tqn and adjusted point Tqh closest to point Tqn on the high-temperature side of point Tqn. Similarly, the interpolation process based on the results of the parameter adjustment for point Tqn can be used to substantially adjust the unadjusted parameter values for unadjusted points Tqk (k=1, 2, . . . , N') between point Tqn and adjusted point Tql closest to point Tqn on the low-temperature side of point Tqn. Hence, the first embodiment enables an effective reduction in the number of those of the plurality of temperature divisions for which the parameters are unadjusted. Furthermore, the substantial adjustment based on the interpolation process enables a reduction in error from the optimum value.

Figure 10:
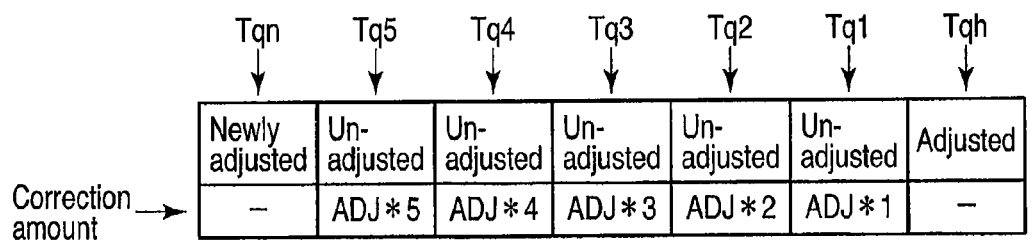
FIG. 10 is a diagram showing an exemplary relationship between a correction amount and five unadjusted points where the five unadjusted points are present between an adjusted point and a new adjusted point.

FIG. 10 shows the relationship between a set of unadjusted points Tq1 to Tq5k and a set of correction amounts ADJ*1 to ADJ*5 observed when N is 5, that is, when unadjusted points Tq1 to Tq5 are present between adjusted point Tqh and new adjusted point Tqn. FIG. 11A and FIG. 11B show examples of the parameter management table 261 obtained before and after the unadjusted parameter adjustment process including the above-described interpolation process. However, for simplification, FIG. 11 shows only a portion of the parameter management table 261 which corresponds to the combination of head 120-$_0$ with head number h of 0 and zone Z0 with zone number z of 0.

Figure 12:
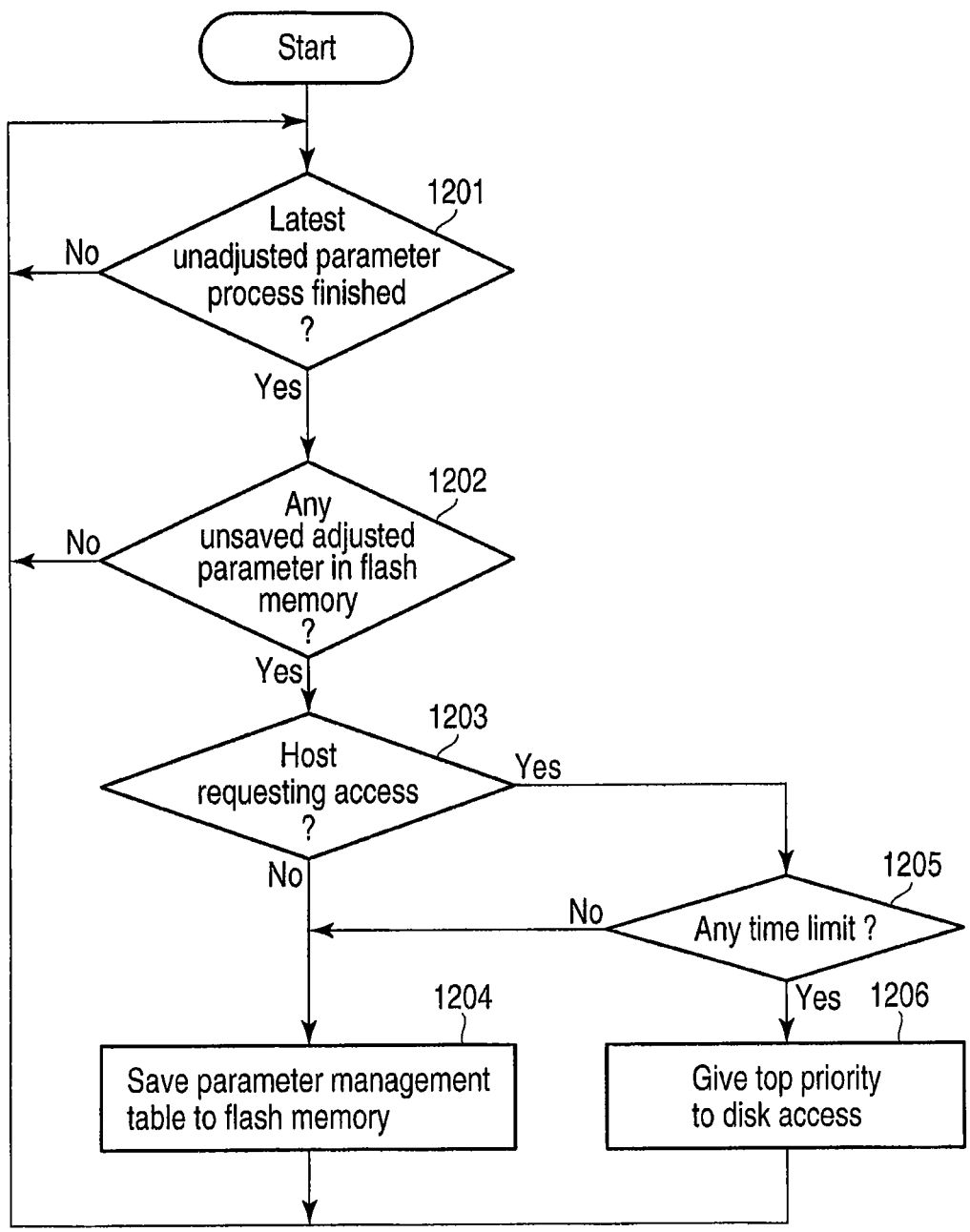
FIG. 12 is a flowchart showing an exemplary procedure for a parameter management table saving process applied in the first embodiment.

In the example of the parameter management table 261 shown in FIG. 11A, only the parameter for the temperature division for a temperature of 20° C. is adjusted. In this state, it is assumed that as a result of execution of an unadjusted parameter adjustment process, the parameter value corresponding to the temperature division for a temperature of 12° C. is adjusted from 11, shown in FIG. 11A, to 12, shown in FIG. 11B. In this example, the amount of change D in the above-described interpolation process (interpolation calculation) is 1. Furthermore, one unadjusted point Tqk, the temperature division for a temperature of 15° C., is present between the temperature division for a temperature of 20° C. (adjusted point Tqh) and the temperature division for a temperature of 12° C. (new adjusted point Tqn). In this case, the unit correction amount ADJ is D/(N+1)=½=0.5. Thus, based on the calculation 11+ADJ*1, the parameter value corresponding to the temperature division for a temperature of 15° C. is updated (that is, corrected) from 11, shown in FIG. 11A, to 11.5, shown in FIG. 11B.

In the first embodiment, the interpolation process is executed during the unadjusted parameter adjustment process. However, the interpolation process may be executed separately from the unadjusted parameter adjustment process. In this case, when a flag indicating that the interpolation process for the corresponding parameter value has been finished is added to the flag table 263, the parameter value for the same temperature division can be prevented from being interpolated a plurality of times.

Now, a parameter management table saving process according to the first embodiment will be described with reference to a flowchart in FIG. 12; the parameter management table saving process saves the parameter management table 261 stored in the RAM 290 to the flash memory 260 serving as a nonvolatile storage medium. First, the CPU 280, for example, periodically determines whether or not the latest unadjusted parameter adjustment process has been finished (block 1201). If the latest unadjusted parameter adjustment process has been finished (Yes in block 1201), the CPU 280 determines whether or not the parameter management table 261 contains any adjusted parameter that has not been saved to the flash memory 260 yet (block 1202).

If the parameter management table 261 contains any unsaved adjusted parameter (Yes in block 1202), the CPU 280 determines whether or not the host 20 has been requesting a disk access (block 1203). If the host has not been requesting a disk access (No in block 1203), the CPU 280 saves the parameter management table 261 stored in the RAM 290 to the flash memory 260 (block 1204). That is, provided that no request for a disk access is issued immediately after the unadjusted parameter adjustment process, the CPU 280 instantly saves the parameter management table 261.

On the other hand, if the host 20 has been requesting a disk access (Yes in block 1203), the CPU 280 determines whether or not the disk access has a time limit (block 1205). If the disk access has no time limit (No in block 1205), the CPU 280 saves the parameter management table 261 to the flash memory 260 (block 1204). That is, the CPU 280 gives top priority to saving of the parameter management table 261. In contrast, if the access has a time limit (Yes in block 1205), the CPU 280 gives top priority to the disk access (block 1206), and returns to block 1201.

Thus, in the first embodiment, the parameter management table 261 is basically saved immediately after the unadjusted parameter adjustment process (that is, the update of the parameter management table 261). However, if disk accesses are consecutively performed, the parameter management table 261 is saved when the disk accesses are interrupted. Alternatively, the parameter management table 261 may be saved when the HDD 10 is switched to a power save mode or when head 120-$j$ is unloaded.

In the first embodiment, the parameter management table 261 is saved to the flash memory 260, and the parameter management table 261 saved to the flash memory 260 is loaded into the RAM 290 when the HDD 10 is powered on. However, the parameter management table 261 may be saved to disk 110-$i$ instead of the flash memory 260.

Second Embodiment

Now, a second embodiment will be described. The configuration of electronic device comprising an HDD according to the second embodiment is similar to that of electronic device comprising the HDD according to the first embodiment. Thus, FIG. 1 and FIG. 3 are hereinafter referred to in a supplementary manner. The second embodiment is characterized in that if a predetermined period elapses from a point of adjustment, then even for an adjusted point, the corresponding parameter is adjusted again in view of time-dependent changes in the HDD 10 (particularly time-dependent changes in write/read characteristics).

Figure 13:
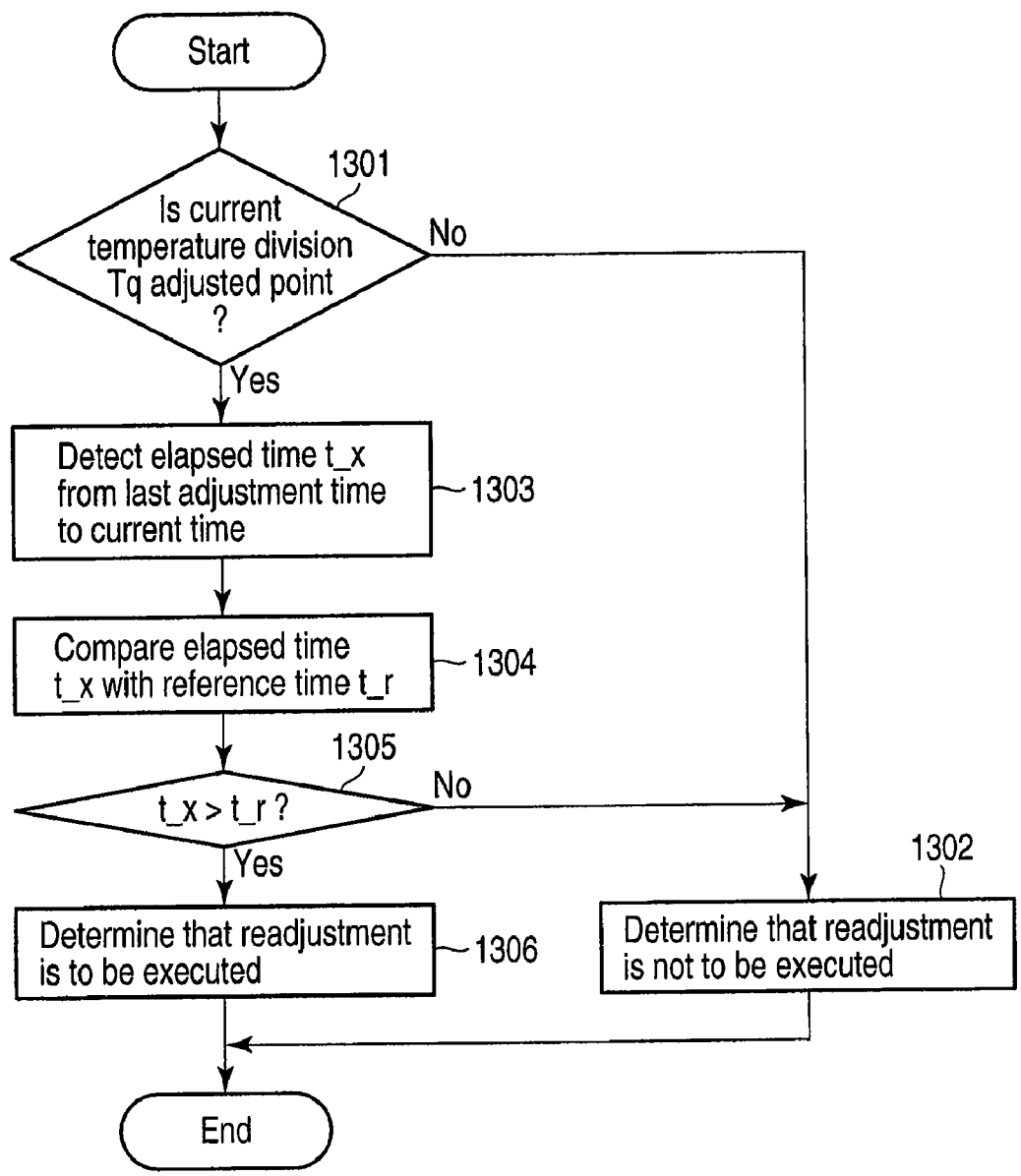
FIG. 13 is a flowchart showing an exemplary procedure for a readjustment determination process applied in a second embodiment.

A procedure for a readjustment determination process according to the second embodiment will be described with reference to a flowchart in FIG. 13. The readjustment determination process may be executed periodically or when disk accesses from the host 20 are interrupted. First, the CPU 280 determines whether or not temperature division Tq to which the current ambient temperature T belongs is an adjusted point (block 1301). In the flowchart in FIG. 13, processing corresponding to blocks 401 and 402 in the flowchart in FIG. 4 is omitted. If current temperature division Tq is not an adjusted point (No in block 1301), the CPU 280 determines that the readjustment is not to be executed (block 1302).

In contrast, if current temperature division Tq is an adjusted point (Yes in block 1301), the CPU 280 detects an elapsed time t_x from the last time point of adjustment until the current time for the adjusted point (block 1303). In the second embodiment, to allow the elapsed time t_x to be detected, the flag corresponding to temperature division Tq is provided with time information indicative of the last (that is, the latest) time point of adjustment. In general, the HDD holds and manages the accumulated value of the energization time from the start of use of the HDD (hereinafter referred to as the total energization time). Thus, the total energization time is used as the time information. The total energization time can be considered to be the current point in time when the HDD is being energized, relative to the start of use of the HDD.

The total energization time at the last time point of adjustment is denoted by t_p. The total energization time at the current point in time is denoted by t_c. In this case, the elapsed time t_x is detected (calculated) in accordance with:

$$t\_x = t\_c - t\_p$$

Then, the CPU 280 compares the elapsed time t_x with a reference time t_r (block 1304). Based on the result of the comparison, the CPU 280 determines whether or not the elapsed time t_x is longer than the reference time t_r (block 1305). As the reference time t_r, a relatively long time during which the optimum parameter value may change, for example, about one week, is applied.

If the elapsed time t_x is longer than the reference time t_r (Yes in block 1305), the CPU 280 determines that the readjustment is to be executed (block 1306). In this case, a parameter adjustment process for adjusting the adjusted parameter corresponding to current temperature division Tq is executed. In contrast, if the elapsed time t_x is not longer than the reference time t_r (No in block 1305), the CPU 280 determines that the readjustment is not to be executed (block 1302).

According to the second embodiment, even for an adjusted point, the corresponding parameter is adjusted again if the reference time t_r elapses from the point of adjustment. Thus, even if time-dependent changes in the HDD 10 cause the optimum write/read conditions to be changed, the parameters can always be maintained at the optimum values.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a parameter management table configured to store a parameter used to write data to a disk or read data from the disk in the parameter management table in association with each of a plurality of predetermined temperature divisions;
a temperature detector configured to detect an ambient temperature of the magnetic disk drive;
a parameter adjustment module configured to adjust a parameter stored in the parameter management table in association with a first temperature division of the plurality of temperature divisions such that the parameter adapts for the first temperature division if the detected ambient temperature corresponds to the first temperature division and if the parameter is unadjusted;
an interpolation module configured to update, by interpolation and based on a result of the adjustment of the unadjusted parameter corresponding to the first temperature division, an unadjusted parameter corresponding to a third temperature division between the first temperature division and a second temperature division for which a parameter is adjusted; and
a vibration detector configured to detect vibration applied to the magnetic disk drive,
wherein the parameter adjustment module is configured to withhold a parameter adjustment process for adjusting the unadjusted parameter if a level of the detected vibration is greater than a first threshold; and
the parameter adjustment module is configured to repeat the parameter adjustment process a plurality of times and to adjust the unadjusted parameter based on a result of the repetition if the level of the detected vibration is not greater than the first threshold but is greater than a second threshold smaller than the first threshold.

2. The magnetic disk drive of claim 1, further comprising a selector configured to select either access to the disk based on the first parameter stored in the parameter management table in association with the first temperature division or access to the disk based on the adjusted parameter after the adjustment of the first parameter by the parameter adjustment module, if a host requests access and if the detected ambient temperature when the access is requested corresponds to the first temperature division and if the first parameter is unadjusted.

3. The magnetic disk drive of claim 2, wherein the selector is configured to select the access to the disk based on the unadjusted parameter if the request for the access specifies a time limit for a response to the request.

4. The magnetic disk drive of claim 2, further comprising a controller configured to switch requested write process to write verify process if the request for the access is the write request and if the access to the disk based on the unadjusted parameter is selected.

5. The magnetic disk drive of claim 1, wherein the second temperature division is closest to the first temperature division on a low-temperature side or a high-temperature side of the first temperature division and is one of the temperature divisions associated with adjusted parameters stored in the parameter management table.

6. The magnetic disk drive of claim 1, wherein:
the parameter management table is configured to store a flag indicating whether or not the parameter corresponding to each of the plurality of temperature divisions is adjusted; and
the parameter adjustment module is configured to switch the flag corresponding to the first temperature division to a status indicating that the corresponding parameter is adjusted if the unadjusted parameter is adjusted to such that the unadjusted parameter adapts for the first temperature division.

7. The magnetic disk drive of claim 1, wherein:
the disk comprises a parameter adjustment area to be used with parameter adjustment process for adjusting the unadjusted parameter separately from a user area; and
the parameter adjustment module is configured to execute the first parameter adjustment process using the parameter adjustment area.

8. A method for adjusting a parameter used to write data to a disk or read data from the disk in a magnetic disk drive comprising a parameter management table configured to store the parameter in association with each of a plurality of predetermined temperature divisions, the method comprising:
identifying a first temperature division from the plurality of temperature divisions which corresponds to an ambient temperature of the magnetic disk drive detected by a temperature detector;
adjusting a parameter stored in the parameter management table in association with the first temperature division such that the parameter adapts for the first temperature division if the first parameter is unadjusted;
updating, by interpolation and based on a result of the adjustment of the unadjusted parameter corresponding to the first temperature division, an unadjusted third parameter corresponding to a third temperature division between the first temperature division and a second temperature division for which a parameter is adjusted;
detecting vibration applied to the magnetic disk drive;
withholding a parameter adjustment process for adjusting the unadjusted parameter if a level of the detected vibration is greater than a first threshold;
repeating the parameter adjustment process a plurality of times if the level of the detected vibration is not greater than the first threshold but is greater than a second threshold smaller than the first threshold; and
adjusting the unadjusted parameter based on a result of the repetition.

9. The method of claim 8, further comprising selecting either access to the disk based on the parameter stored in the parameter management table in association with the first temperature division or access to the disk based on the adjusted parameter after the adjustment of the parameter, if a host requests access and if the detected ambient temperature when the access is requested corresponds to the first temperature division and if the parameter is unadjusted.

10. The method of claim 8, wherein the second temperature division is closest to the first temperature division on a low-temperature side or a high-temperature side of the first temperature division and is one of the temperature divisions associated with adjusted parameters stored in the parameter management table.

11. The method of claim 8, wherein:
the parameter management table is configured to store a flag indicating whether or not the parameter corresponding to each of the plurality of temperature divisions is adjusted; and the method further comprises switching the flag corresponding to the first temperature division to a status indicating that the corresponding parameter is adjusted if the unadjusted parameter is adjusted such that the unadjusted parameter adapts for the first temperature division.

12. The method of claim 8, wherein:

the disk comprises a parameter adjustment area to be used with parameter adjustment process for adjusting the unadjusted parameter separately from a user area; and the parameter adjustment process is executed using the parameter adjustment area.

* * * * *